(12) United States Patent
Kang et al.

(10) Patent No.: US 7,507,082 B2
(45) Date of Patent: Mar. 24, 2009

(54) MOLD ADJUSTMENT DEVICE OF INJECTION MOLDING MACHINE PROVIDED WITH SPHERICAL BEARINGS

(75) Inventors: Young-Ju Kang, Seoul (KR); Ick-Sung Choe, Yongin-si (KR); Aliaksandr Skuratovich, Seoul (KR); Pyeong-Kwan Chung, Anyang-si (KR); Seung-Dong Park, Suwon-si (KR)

(73) Assignee: LS Mitron Ltd., Anyang (KR)

( * ) Notice: Subject to any disclaimer, the term of this patent is extended or adjusted under 35 U.S.C. 154(b) by 228 days.

(21) Appl. No.: 11/396,418

(22) Filed: Mar. 31, 2006

(65) Prior Publication Data

US 2006/0251758 A1 Nov. 9, 2006

(30) Foreign Application Priority Data

Apr. 2, 2005 (KR) .................. 10-2005-0027809

(51) Int. Cl.
*B29C 45/64* (2006.01)

(52) U.S. Cl. .................. 425/589; 425/590; 425/595

(58) Field of Classification Search .................. 425/589, 425/590, 595
See application file for complete search history.

(56) References Cited

U.S. PATENT DOCUMENTS 3,346,925 A * 10/1967 Maier .................. 425/589

* cited by examiner

*Primary Examiner*—Tim Heitbrink
(74) *Attorney, Agent, or Firm*—Jones Day

(57) ABSTRACT

A mold adjustment device of an injection molding machine is required for movement of a rear template that moves depending on a size of a mold in a toggle clamp of the injection molding machine. At this time, a spherical bearing and/or a bushing is attached to an outer circumference of a nut of a tie bar gear that rotates along a tie bar and a tie bar screw enduring a clamping force of the toggle clamp so as to be contacted with the rear template. This mold adjustment device clears up any factor generating vibration or noise during the injection molding, thereby remarkably decreasing stoppage generated during the mold adjustment process and also relatively reducing vibration and noise.

2 Claims, 4 Drawing Sheets

MOLD ADJUSTMENT DEVICE OF INJECTION MOLDING MACHINE PROVIDED WITH SPHERICAL BEARINGS

BACKGROUND OF THE INVENTION

1. Field of the Invention

The present invention relates to mold adjustment of an electromotive injection molding machine, and more particularly to a mold adjustment device of an injection molding machine, to which spherical bearings are mounted to solve the stoppage problem occurring during the mold adjustment operation.

2. Description of the Related Art

For mold adjustment in a conventional electromotive injection molding machine, a motor (not shown) rotates a ring gear 1 so that a tie bar gear 2 attached to the ring gear 1 is rotated, and accordingly a nut 3 inserted into a rear template 4 is rotated to move forward and rearward along a screw 51 of a tie bar 5, as shown in FIG. 1.

At this time, the nut 3 moves with pushing the rear template 4, thereby allowing mold adjustment.

In this conventional configuration, the tie bar gear 2 rotating along four tie bars 5 and the screws 51 of the tie bars 5 is directly contacted with the rear template 4, which may apply a clamping force to the tie bars 5, or the rear template may be twisted when another external force is applied thereto, which may make the tie bar gear 2 be engaged with the rear template 4. That is to say, the tie bar gear 2 moving along the tie bars 5 and the screws 51 of the tie bars 5 is directly contacted with the rear template 4, so the tie bar gear 2 directly receives a force applied toward the rear template 4 when this force is transmitted to the tie bars 5. At this time, if the rear template 4 is twisted, the tie bar gear 2 is engaged with the rear template 4 as shown in FIG. 2. Thus, when moving a position of the rear template for mold adjustment, the engagement between the tie bar gear 2 and the rear template 4 may disturb the mold adjustment process.

In case the tie bars or the rear template is bent due to the engagement shown in FIG. 2, a nut may also be held therein not to move. In order to solve this problem, there is needed a structure capable of relieving stress generated between the tie bars 5 and the rear template 4 during injection molding.

In addition, in case of a precise injection molding, more precise control is occasionally required.

SUMMARY OF THE INVENTION

The present invention is designed to solve the problems of the prior art, and therefore it is an object of the present invention to relieve a stress given to a rear template when a tie bar is bent up or down and also clear away any engagement between the tie bar and the rear template, which may cause any problem in mold adjustment.

In order to accomplish the above object, the present invention provides a mold adjustment device of an injection molding machine, which is required for movement of a rear template that moves depending on a size of a mold in a toggle clamp of the injection molding machine, wherein a spherical bearing and/or a bushing is attached to an outer circumference of a nut of a tie bar gear that rotates along a tie bar and a tie bar screw enduring a clamping force of the toggle clamp so as to be contacted with the rear template.

Preferably, the spherical bearing including the nut may be separately attached or integrally formed into one member including a nut unit and a spherical bearing unit.

In addition, a groove may be formed in the nut or nut unit or formed in a length direction in an outer side of the nut or nut unit.

BRIEF DESCRIPTION OF THE DRAWINGS

Other objects and aspects of the present invention will become apparent from the following description of embodiments with reference to the accompanying drawing in which.

DESCRIPTION OF THE PREFERRED EMBODIMENT

Figure 1:
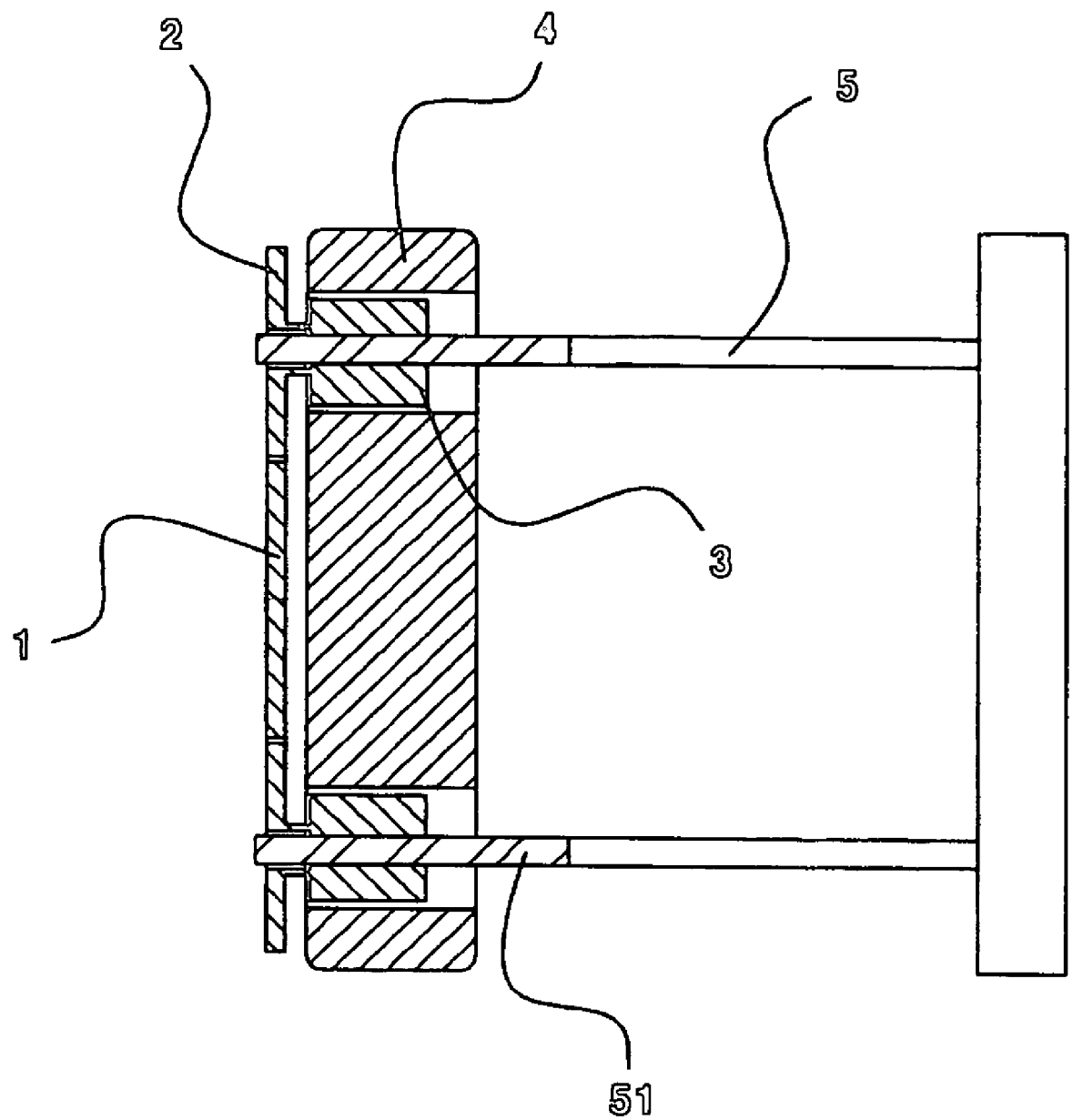
FIG. 1 is a schematic view showing a mold adjustment device of a conventional template.
Figure 2:
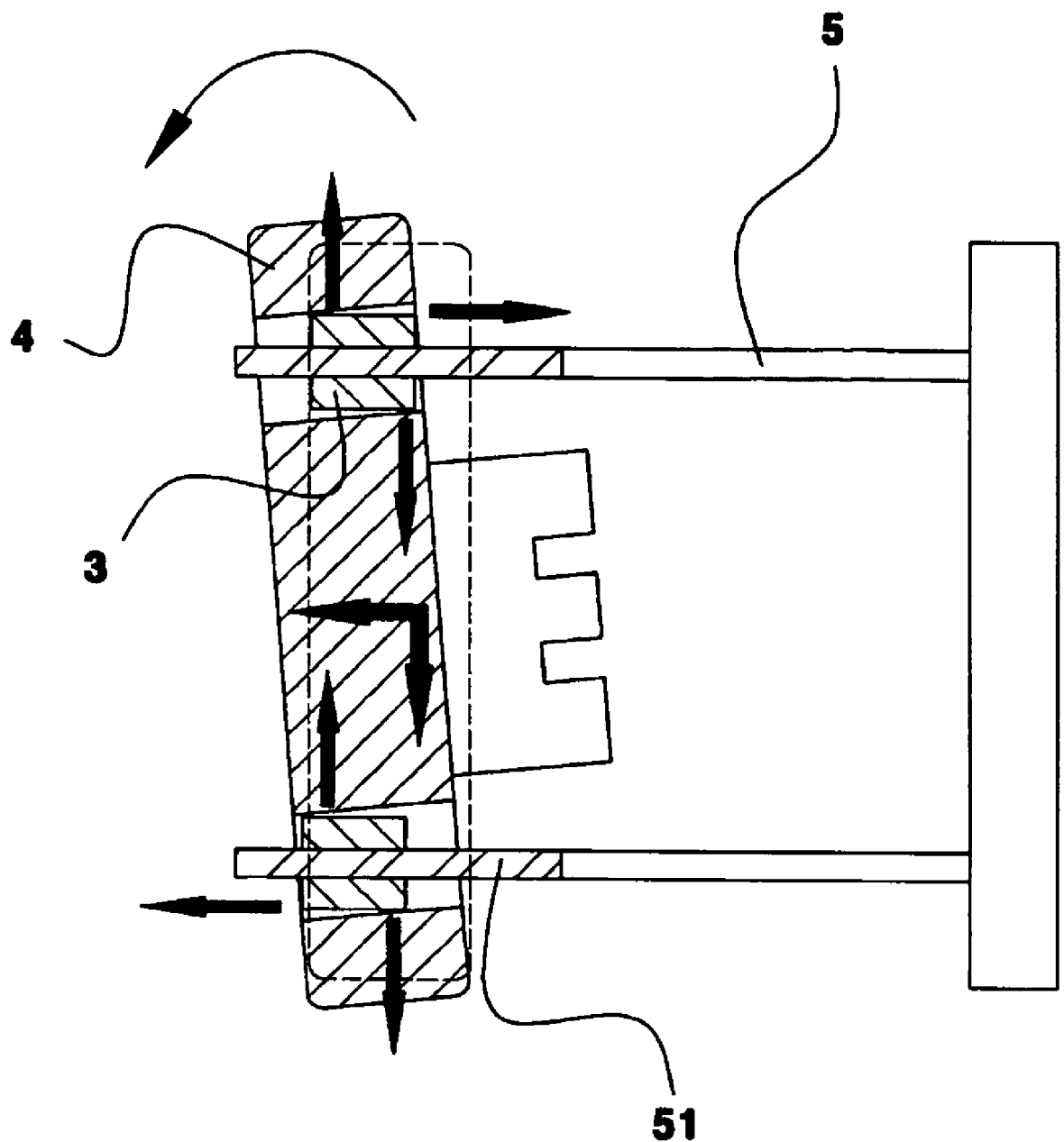
FIG. 2 is a schematic view showing external force applied to a conventional template.

Hereinafter, the present invention will be described in more detail referring to the drawings.

Figure 3:
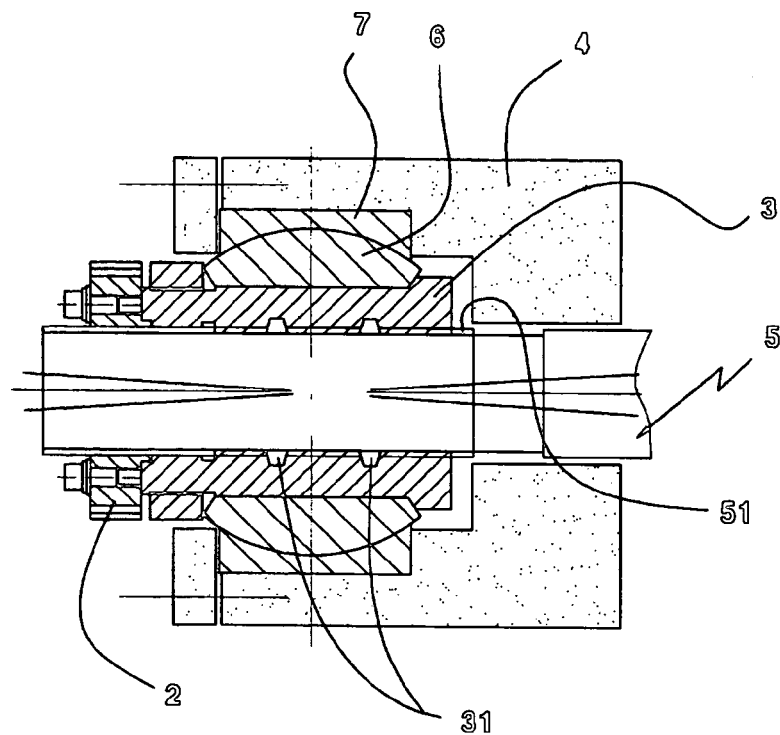
FIG. 3 is a detailed sectional view showing a coupled mold adjustment device according to the present invention.
Figure 4:
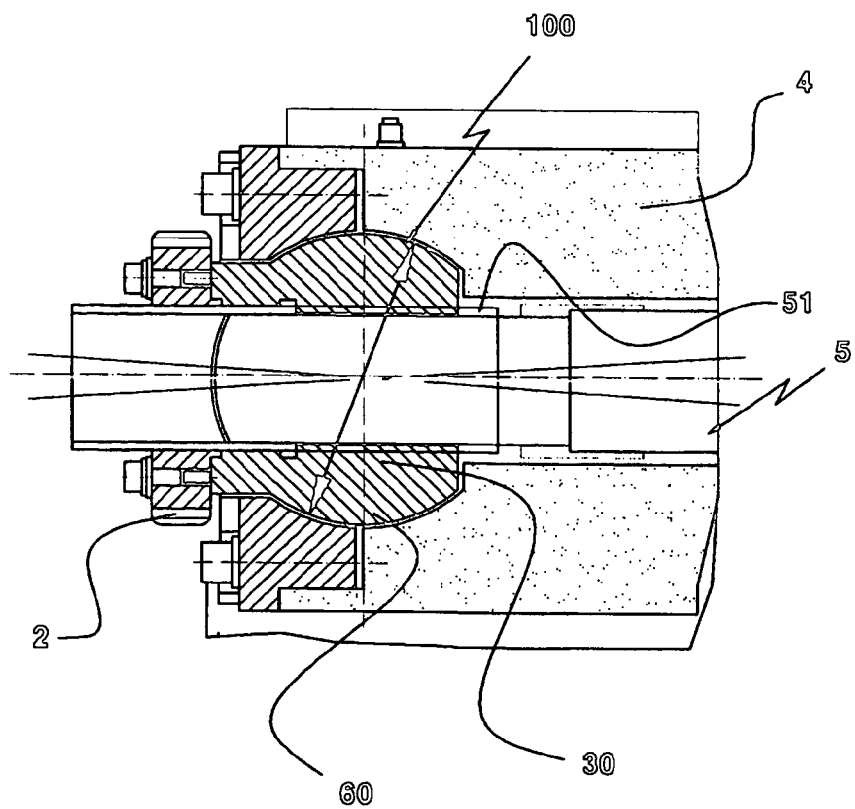
FIG. 4 is a detailed sectional view showing an integrated mold adjustment device according to the present invention.
Figure 5:
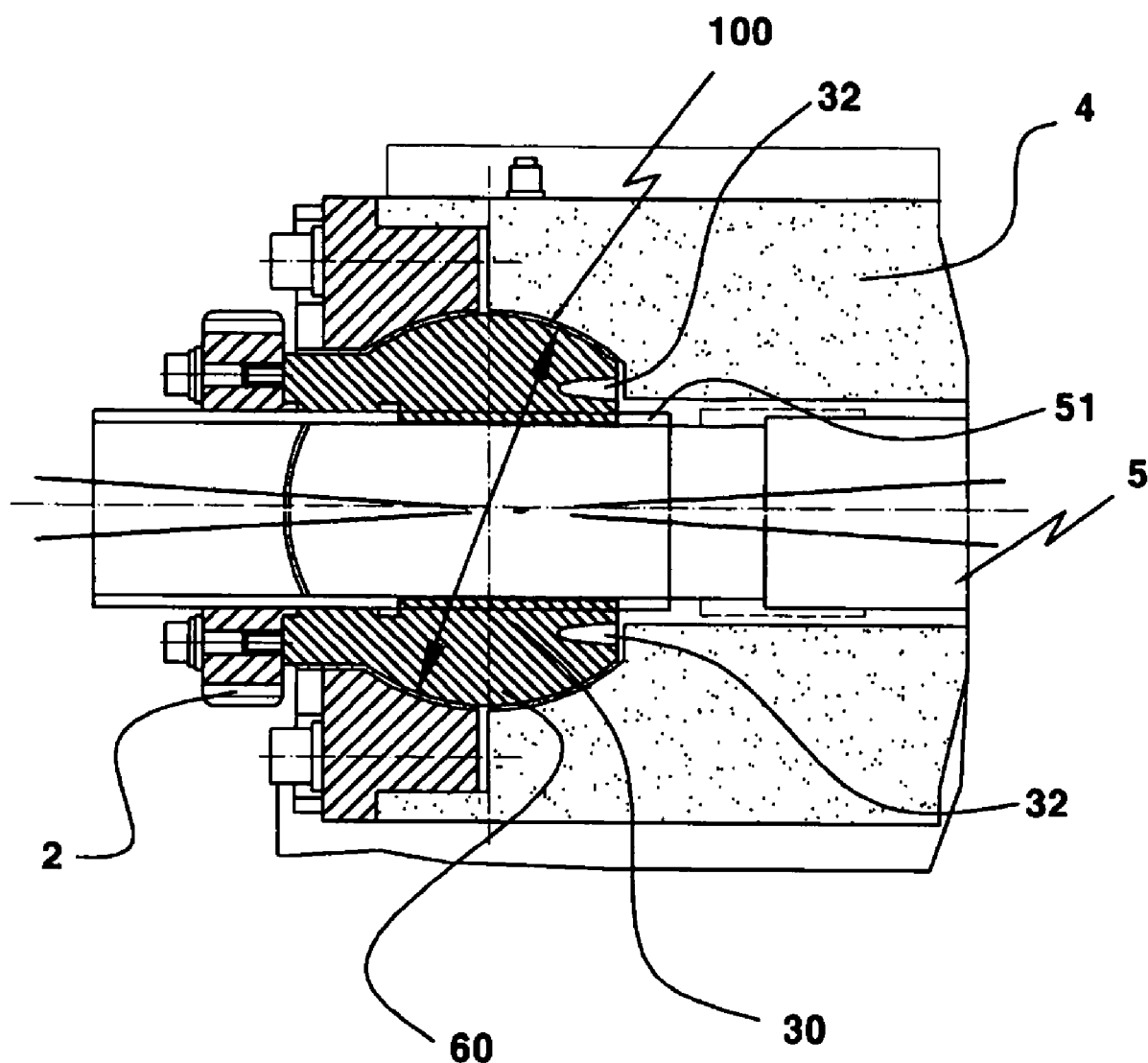
FIG. 5 is a perspective view showing an integrated mold adjustment device of FIG. 4, which has a groove according to another embodiment of the present invention.

FIG. 3 is a detailed sectional view showing a coupled mold adjustment device according to the present invention, FIG. 4 is an integrated mold adjustment device according to the present invention, and FIG. 5 is a perspective view showing the integrated mold adjustment device, which has a groove according to another embodiment of the present invention.

A mold adjustment device of an injection molding machine is required for movement of a rear template that moves depending on a size of a mold in a toggle clamp of the injection molding machine. Here, a spherical bearing 6 and/or a bushing 7 is attached to an outer circumference of a nut 3 of a tie bar gear 2 that rotates along a tie bar 5 and a tie bar screw 51 enduring a clamping force of the toggle clamp so as to be contacted with the rear template.

In this connection, the nut 3 and the spherical bearing 6 mounted to an outside of the nut 3 may be integrated as one member 100 including a nut unit 30 and a spherical bearing unit 60, which is also included in the scope of the present invention. Preferably, a groove 31 is formed in the nut unit 30 of the member 100.

Meanwhile, the present invention is also characterized in that a groove 32 is formed in a length direction in an outer side of the nut unit 30 as shown in FIG. 5.

The nut 3 or the nut unit 30 having the spherical bearing 6 or the spherical bearing unit 60 according to the present invention plays a role of relieving a stress from a rear template 4 when the tie bar 5 is bent up or down.

The groove 31, 32 formed in the nut 3 or the nut unit 30 plays a role of making the nut 3 or the nut unit 30 more flexible and dispersing the stress applied therein.

In the configuration of the mold adjustment device according to the present invention, the spherical bearing and/or bushing is attached between the tie bar gear 2 and the rear template 4 so that the tie bar gear and the rear template are not directly contacted. In addition, since the spherical bearing and/or bushing is mounted between the rear template and the tie bar gear, they are not engaged with each other though the rear template is twisted. Thus, the tie bar gear may easily rotate along a screw line on the tie bar, not being held therein, so the tie bar gear does not stop during the mold adjustment process. In addition, the above configuration allows precise movement and ensures fewer malfunctions in the long run.

In addition, the mold adjustment device of the present invention does not generate vibration or noise during work.

APPLICABILITY TO THE INDUSTRY

The mold adjustment device configured and operated as described above according to the present invention attempts to solve a conventional stoppage problem during the mold adjustment process by increasing a gap between the nut and the rear template. The present invention clears up any factor generating vibration or noise during the injection molding, thereby remarkably decreasing stoppage generated during the mold adjustment process and also relatively reducing vibration and noise.

What is claimed is:

1. A mold adjustment device of an injection molding machine, which is required for movement of a rear template that moves depending on a size of a mold in a toggle clamp of the injection molding machine, wherein a spherical bearing and/or a bushing is attached to an outer circumference of a nut of a tie bar gear that rotates along a tie bar and a tie bar screw enduring a clamping force of the toggle clamp so as to be contacted with the rear template, and wherein a groove is formed in a length direction in an outer side of the nut.

2. A mold adjustment device of an injection molding machine, which is required for movement of a rear template that moves depending on a size of a mold in a toggle clamp of the injection molding machine, wherein a spherical bearing and/or a bushing is attached to an outer circumference of a nut of a tie bar gear that rotates along a tie bar and a tie bar screw enduring a clamping force of the toggle clamp so as to be contacted with the rear template, wherein the spherical bearing including the nut is integrally formed into one member including a nut unit and a spherical bearing unit, and wherein a groove is formed in a length direction in an outer side of the nut unit.

* * * * *